United States Patent [19]

Suzuki et al.

[11] Patent Number: 5,369,734
[45] Date of Patent: Nov. 29, 1994

[54] METHOD FOR PROCESSING AND DISPLAYING HIDDEN-LINE GRAPHIC IMAGES

[75] Inventors: Yoshie Suzuki, Kawasaki; Shin Nakamura, Tokyo; Akio Nakagawa, Hiratsuka, all of Japan

[73] Assignee: Kabushiki Kaisha Toshiba, Kawasaki, Japan

[21] Appl. No.: 701,084

[22] Filed: May 16, 1991

[30] Foreign Application Priority Data

May 18, 1990 [JP] Japan .................. 2-126799
May 18, 1990 [JP] Japan .................. 2-126800

[51] Int. Cl.$^5$ .............................. G06F 15/72
[52] U.S. Cl. .................... 395/121; 395/119; 395/123
[58] Field of Search ............ 395/121, 123, 119

[56] References Cited

U.S. PATENT DOCUMENTS 5,163,126 11/1992 Einkauf et al. ............ 395/123

FOREIGN PATENT DOCUMENTS 285978 3/1990 Japan .

OTHER PUBLICATIONS

Fuller, "Using Antocad ®" Third Edition, Release 10 with 3-D, Delmar Publishers Inc., 1989, pp. 17-10 through 17-13 and 19-14 through 19-18.
"A Two-Space Solution to the Hidden Line Problem for Plotting Functions of Two Variables", IEEE Trans. Comput. vol. 22, p. 28 (1973). (Wright, T. J.).
"Hidden Line Subroutines for Three-Dimensional Plotting", Byte, vol. 3, p. 49 (1978). (Gottlieb, M.).

*Primary Examiner*—Mark K. Zimmerman
*Attorney, Agent, or Firm*—Oblon, Spivak, McClelland, Maier & Neustadt

[57] ABSTRACT

In a graphic display processing method, a surface to be displayed is regarded as an aggregation of rectangular meshes, a painting function of a graphic terminal is performed on mesh strips from the one farthest from a viewpoint to the one closest to the viewpoint, and the meshes are displayed and hidden-line processed to eliminate hidden-lines from the image. The twist state of each mesh and the twist between two adjacent meshes are determined. A plurality of twist-free meshes are painted as a group.

11 Claims, 12 Drawing Sheets

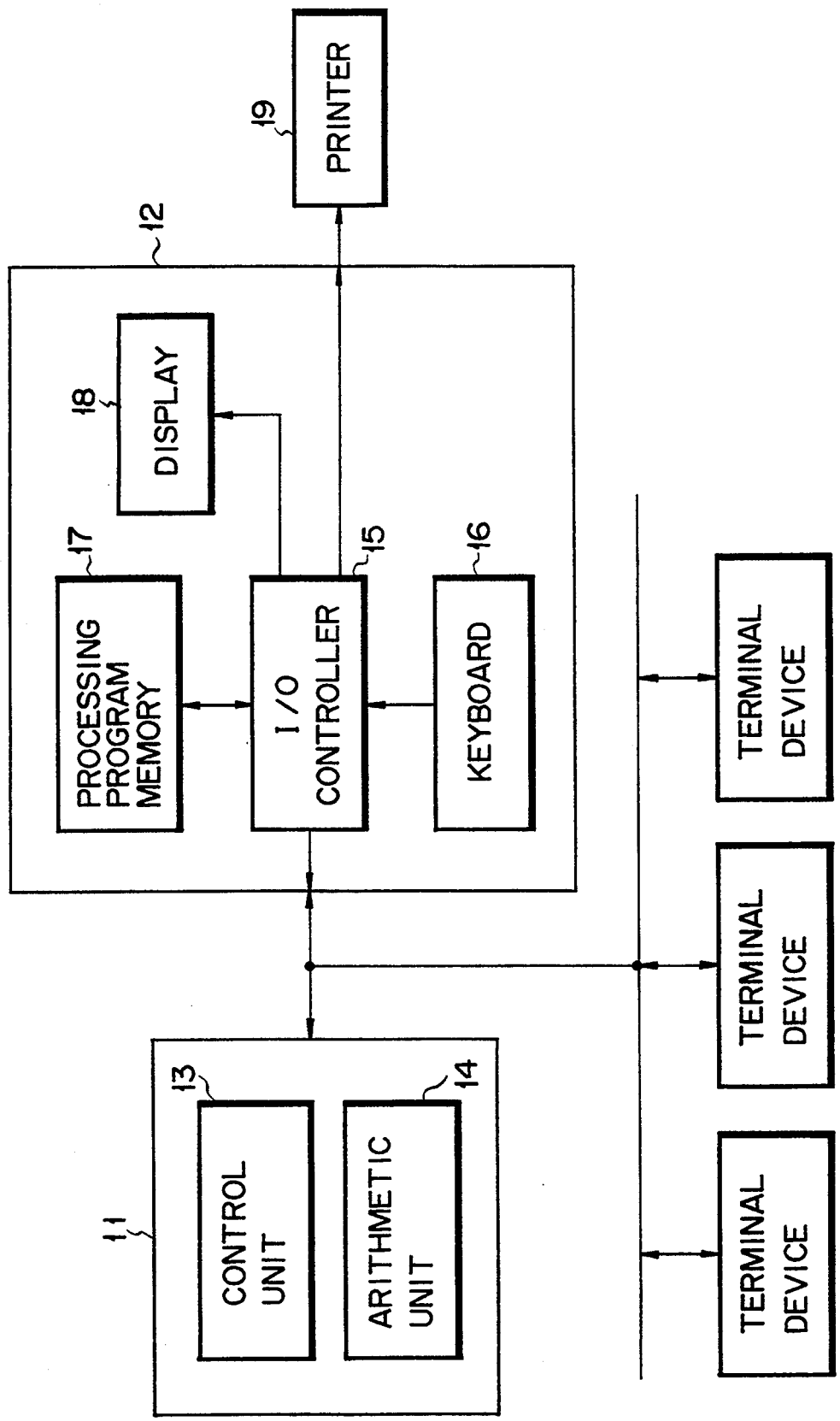

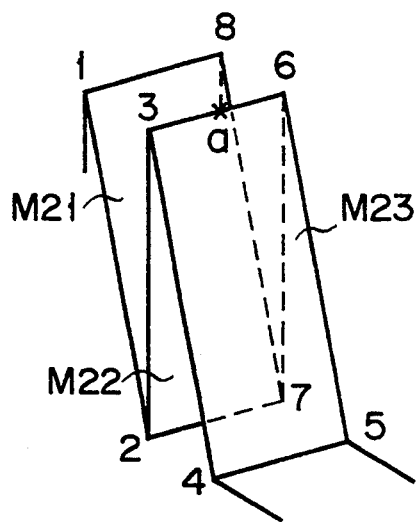
F I G. 15A
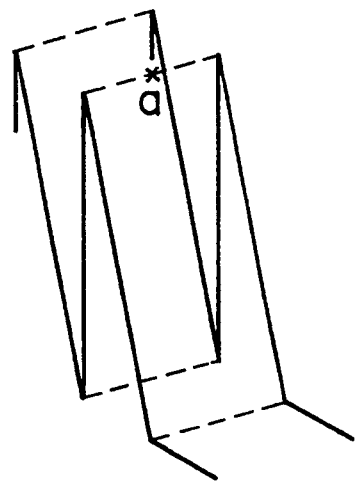
F I G. 15B
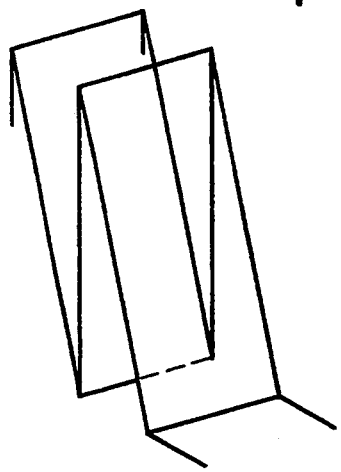
F I G. 15C
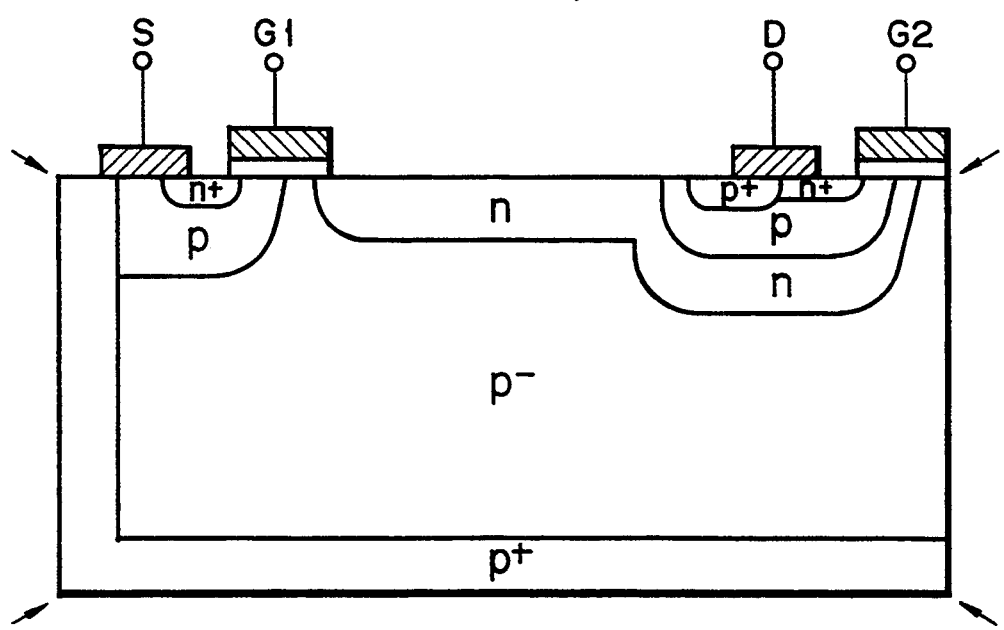
F I G. 18

METHOD FOR PROCESSING AND DISPLAYING HIDDEN-LINE GRAPHIC IMAGES

BACKGROUND OF THE INVENTION

1. Field of the Invention

The present invention relates to a graphic display processing method for displaying a graphic image through a hidden processing for eliminating hidden lines from perspective represents of a three-dimensional structure, by use of a painting function of a graphic terminal device.

2. Description of the Related Art

Conventional methods of displaying a three-dimensional structure, such as three-space objects, a curved surface or an impurity concentration distribution in a predetermined cross section of a semiconductor, by means of line drawing, include a floating horizontal line algorithm and cross-hatching algorithm (e.g. see "JISSEN COMPUTER GRAPHICS", edited by Fujio YAMAGUCHI, Nikkan Kogyo Shinbun-Sha).

According to the floating horizontal line algorithm, an image is described by first drawing a line closest to a view point, and a hidden-line processing is performed on an overlapped portion of a front image and a rear image. Specifically, an overlapped portion of the rear image is represented by a hidden line. In the hidden-line processing, intersections of the front and rear images are found by calculations. On the basis of the found intersections, the hidden-line processing is carried out. Thus, a great amount of calculations are required and high-speed hidden-line processing cannot be performed.

On the other hand, according to the cross-hatching algorithm, a plurality of two-dimensional images are sequentially described in an overlapped manner from the image farthest from a viewpoint to the image closest thereto. By painting the overlapped portion of the front image, the hidden-line processing of the rear image is effected. According to this painting method, the hidden-line processing is carried out without performing a great amount of calculations, unlike the floating horizontal line algorithm. There are such problems in floating horizontal line algorithm that in a line segment which is to be or not to be displayed, the visible/invisible determination for intersections are performed for one intersection; thus, if the visible/invisible state varies with respect to plural intersections within one region, the hidden-line processing cannot be carried out exactly.

SUMMARY OF THE INVENTION

An object of the present invention is to provide a graphic display processing method in which a graphic image can be hidden-line processed exactly and quickly, irrespective of the visibility and invisibility states of any portion of a three-dimensional surface. This method is especially suited to display a hidden-line processed image of any designated portion of the three-dimensional surface.

According to the present invention, there is provided a graphic display processing method, wherein a surface to be displayed is regarded as a number of mesh strips or an aggregation of rectangular meshes, an erasure function of a graphic terminal is performed on divisional mesh strips from the one farthest from a viewpoint to the one closest thereto, and a projection figure of a three-dimensional structure is hidden-line processed and displayed. In this method, for example, cutting planes are defined as planes to designate a portion to be displayed, and it is determined whether the cutting plane crosses each mesh. Each mesh crossed by one of the cutting planes is displayed separately. Of the other meshes to be displayed, distortion-free (twist-free) meshes in one mesh strip are hidden-line processed as a group. The meshes to be displayed are grouped and subjected to hidden-line processing in the following manner.

First, the distortion state of one mesh including a terminal point farthest from the viewpoint is determined with respect to a mesh strip farthest from the viewpoint. When the mesh has distortion, the data of the location of the mesh is stored so that the mesh is individually displayed. When the mesh has no distortion, the distortion state of the two adjacent meshes including this mesh is determined. When the two adjacent meshes have distortion, the data of the boundary of these meshes is stored so that the meshes are divisionally displayed.

The above operation is repeated and, as a result, a series of a plurality of distortion-free meshes are grouped as one strip region. A projection figure is hidden-line processed by a painting function on a region-by-region basis. The contour line of each region and boundary lines of meshes are, then, drawn. Similarly, the mesh strips are successively displayed towards the viewpoint.

In the present invention, a surface to be displayed is regarded as an aggregation of tiny rectangular meshes. Using a painting function of a graphic terminal, divisional mesh strips (each consisting of meshes) are displayed from the one farthest from the viewpoint and are subjected to hidden-line processing. In this case, if each rectangular mesh is processed, the amount of data transfer becomes enormous, and much time is required for display. In the present invention, therefore, the distortion state of each mesh and the distortion state of two adjacent meshes are determined, and distortion-free meshes are grouped in one region and processed. A projection figure of a curved plane of any complex shape can be hidden-line processed exactly and quickly. In this case, the condition of a cutting plane for designating a portion to be displayed and a portion not to be displayed is set, and it is determined whether the cutting plane crosses meshes or not. Based on the determined result, only a designated portion is displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a computer system used in the graphic display processing according to the present invention;

FIGS. 15A to 15C show an example of erroneous display in the case where the determination of distortion has not been made;

FIG. 18 is a cross-sectional view of a lateral insulation gate bipolar transistor.

DETAILED DESCRIPTION OF THE PREFERRED EMBODIMENTS

Figure 2A:
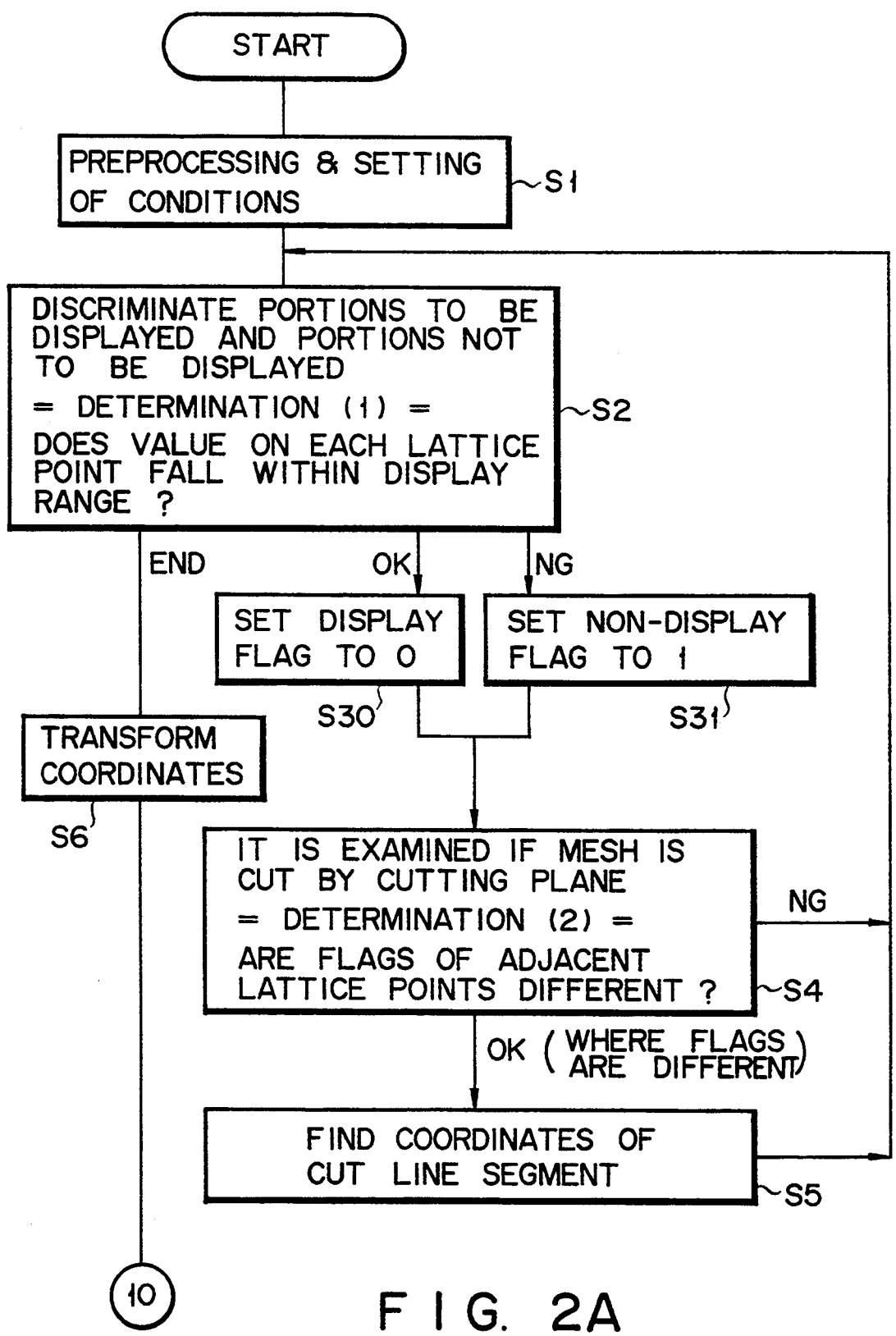
FIGS. 2A and 2B are flowcharts illustrating the procedures of the graphic display processing method according to an embodiment of the present invention.

FIG. 1 shows a computer system used in the graphic display processing of the present invention. According to this system, a host computer 11 and a plurality of terminal devices 12 are mutually connected. The host computer 11 comprises a large-scale computer including a control unit 13 and an arithmetic unit 14. The terminal device 12 comprises an I/O controller 15, a keyboard 16 connected to the I/O controller 15, a memory 17 for storing a processing program, and a CRT display 18. A printer 19 is also connected to the I/O controller 15. The printer 19 can be used commonly for the plural terminal devices 12. The terminal device 12 is a two-dimensional graphic terminal having a function of displaying not only characters but also figures. The terminal devices 12 are connected to the host computer 11, and receive the operation results output from the arithmetic unit 14 in the host computer 11, thereby displaying the operation results.

Figure 2B:
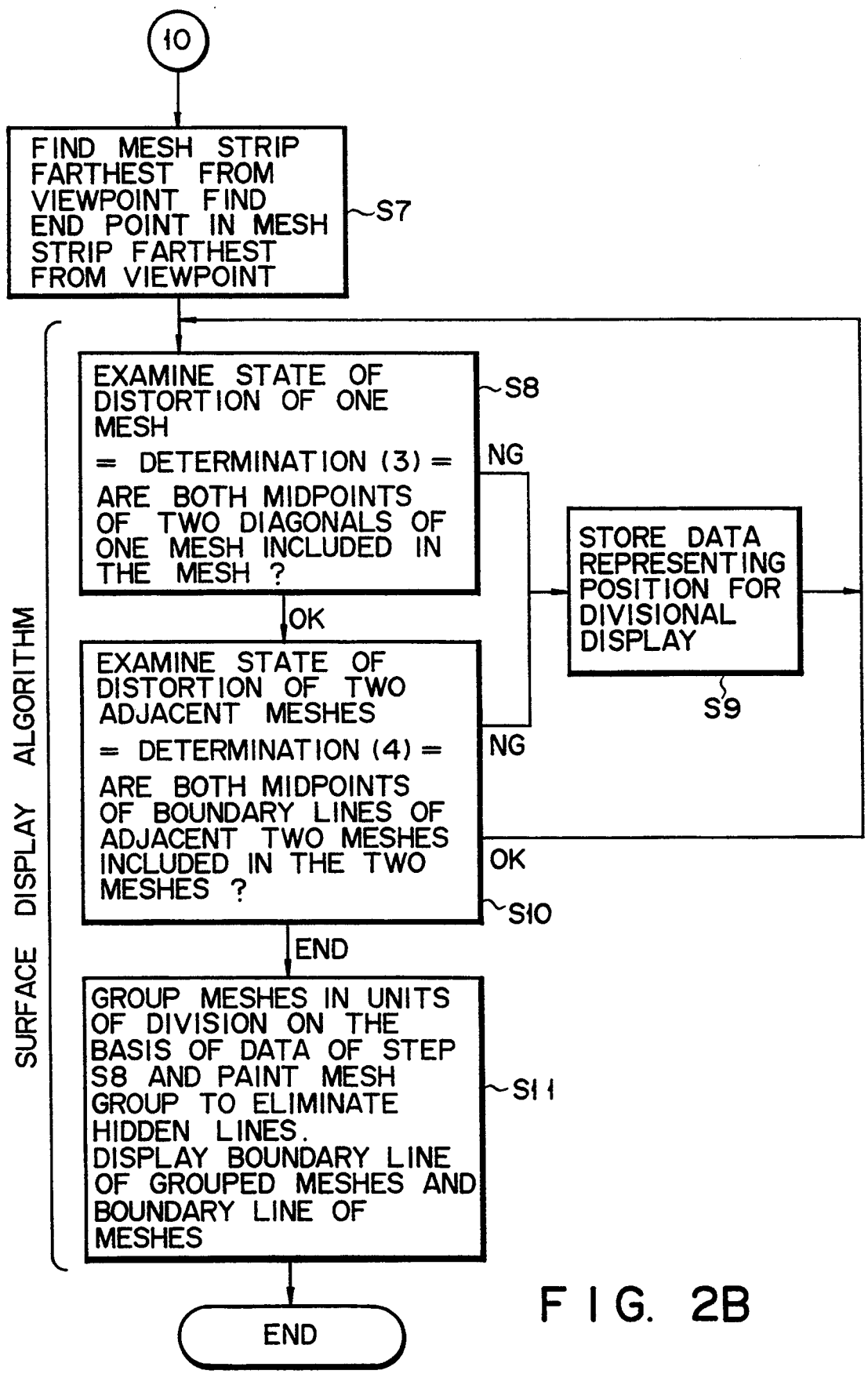

The graphic display processing method of the present invention, which is executed by use of the above computer system, will now be described with reference to the flowcharts of FIGS. 2A and 2B.

In a pre-processing, various conditions, such as a viewpoint, a display location on a screen, and data are set by means of the keyboard 16 (step S1). These conditions include cutting-plane coordinates for partial display, that is, for separating a three-dimensional structure to be displayed on the display 18 into portions to be actually displayed on the display screen and portions to be not displayed. It is determined whether each of meshes (rectangular elements) obtained by dividing the display surface by a coordinate lattice crosses the cutting-plane. Specifically, the host computer 11 determines whether the data value on each lattice point falls within the display range (step S2), and adds a determination flag to each lattice data. For example, in the case of "display", flag=0. In the case of "non-display", flag=1 (step S30, step S31). On the basis of the determination flag, the host computer 11 determines whether each mesh (each rectangular element) crosses a cutting plane, that is, whether each mesh is cut by the cutting plane (step S4). If the mesh is cut by the cutting plane, the intersection (cut part) of the mesh and cutting plane is found and stored (step S5).

After the above operation of the host computer 11 is performed on all meshes, the coordinates of the partial layer to be displayed and the cut portion are coordinate-transformed (step S6).

Once the host computer 11 completes the coordinate transformation processing, as described above, the data is transferred to the terminal computer 12. The host computer 11 sends the image data to the terminal device 12 in accordance with the surface display algorithm. The hidden-line processed data is sent to the terminal device 12 and shown on the display 18. In this case, the host computer 11 displays the mesh crossing the cutting plane, as a single unit, and groups the meshes which do not cross the cutting plane, in accordance with the below-described distortion determination. Specifically, the host computer 11 finds a rectangular element group including a plurality of rectangular elements arrayed in a strip form, that is, a mesh strip which is situated farthest from a viewpoint, and also finds a terminal end point in the mesh strip farthest from the viewpoint (step S7). Then, it is determined if a first mesh including the terminal point, i.e. the mesh farthest from the viewpoint, is distorted or twisted (step S8). When the first mesh is distorted, this mesh is stored as mesh to be divided and displayed (step S9). When the mesh is not distorted, the state of distortion (twist) between two meshes (two rectangular elements), i.e. the first mesh and a second mesh adjacent to the first mesh is determined (step S10). When a distortion exists between the two meshes, the boundary of the two meshes is stored as a position for divisional display of the two meshes (step S9). When the distortion does not exist between two meshes, the control routine is returned to step S8 and the state of distortion of the second mesh is similarly determined. Further, if the second mesh is not distorted, the state of distortion of the second and third meshes is determined.

The similar operation is repeated with respect to the meshes in the same mesh strip. Meshes, each of which has no distortion therein and between which has no distortion, are grouped as a region. The data is send to the terminal device 12 for each divisional unit of the grouped meshes, whereby the hidden-line processing is performed for each divisional unit by the painting function. Then, the display 18 displays the boundary line of the grouped meshes and the boundary lines between adjacent two meshes.

Regarding a mesh, this is crossed by a cutting plane, at first the mesh is painted out and all the visible boundary lines connect the visible lattice points and the intersection points (step 11).

The processing for one mesh strip has been described above. All mesh strips are processed sequentially towards the viewpoint, and all curved surfaces are subjected to hidden-line processing. Thus, the processed image is displayed.

The contents of the display processing described with reference to FIGS. 2A and 2B will now be described in greater detail by referring to FIGS. 3 to 15C.

Figure 3:
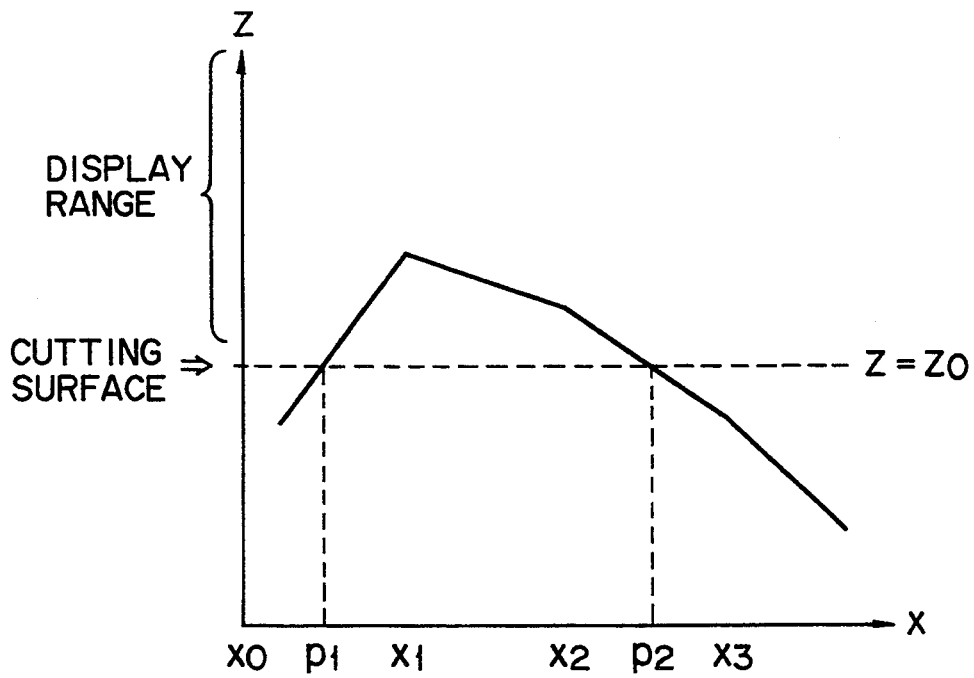
FIGS. 3 and 4 are views for explaining a display range determining method.

First, the method of distinguishing a display portion and a non-display portion will be described with reference to FIGS. 3 and 4.

It is determined if the value on each lattice point falls within the display range defined by a predetermined cutting plane. If the value is in the range, the determination flag is set to "display", and if the value is not, the flag is set to "non-display". On the basis of the determination flag of the lattice point (base point) under current examination and the determination flag of the adjacent lattice point, the shape of the mesh is found. When the mesh is cut, the coordinates of the intersection (cut portion) of the cutting plain and the mesh are found. For example, when a curve in a divisional surface at a given y-coordinate of a surface to be displayed and a cutting plane $z=z_0$ have such a relationship as is shown in FIG. 3, the determination flag at the lattice point $x_0$ is "non-display" and the determination flag at the adjacent lattice point $x_1$ is "display". Thus, it is determined that the mesh defined by $x_0$ to $x_1$ crosses the cutting plane $z=z_0$, that is, the mesh is cut. Then, the coordinates of the intersection p1 of this mesh and the cutting plane are found. Similarly, the determination flag at the lattice point $x_2$ is "display" and the flag at the lattice point $x_3$ is "non-display". Thus, regarding the mesh of $x_2$ to $x_3$, the coordinates of the intersection p2 are found.

Figure 4:
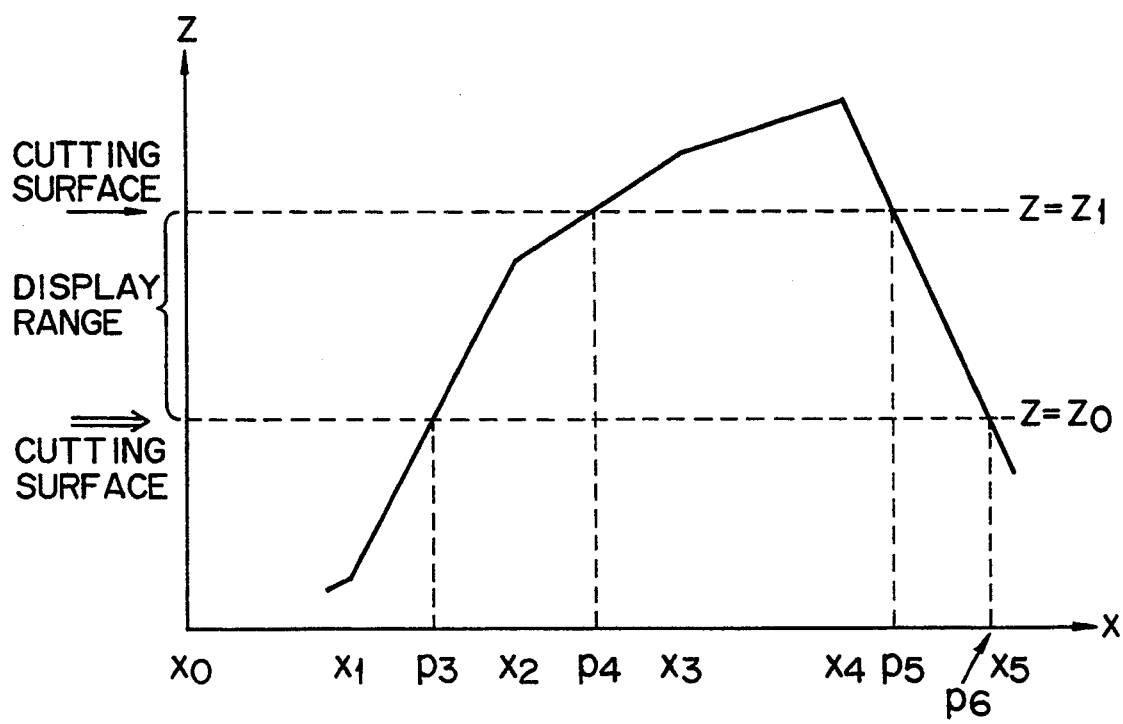

As is shown in FIG. 4, it is possible to provide two cutting planes $z=z_0$ and $z=z_1$. In this case, the coordinates of a cut portion can be obtained, unless the lattice points continue in the order of "display"→"display"→'-'display". For example, in the case shown in FIG. 4, the lattice points $x_0$ to $x_3$ represent "non-display"→"display"→"non-display", the meshes on both sides of the base point are cut. Accordingly, the coordinates of intersections p3 and p4 can be found. The lattice points $x_3$ and $x_4$ represent "non-display"→"non-display"; thus, the mesh between these points are not displayed. Although the lattice points $x_4$ and $x_5$ represent "non-display"→"non-display", the mesh between these points is cut by two cutting planes. Thus, two intersections, i.e. cut-portion coordinates p5 and p6, are obtained. This can be determined, depending on whether the values of the coordinates of the cutting plane or the data values on the lattice points are the greater.

The cut-portion coordinates thus obtained and the position of the mesh position are memorized, and the cut-portion coordinates are coordinate-transformed similarly with other lattice points. The non-cut mesh is processed by using the surface display algorithm for each mesh, and the cut mesh is displayed as a single element in accordance with the transformed cut-portion coordinates.

When a curved plane is displayed in a two-dimensional manner, the curved plane is divided by a series of parallel planes in a two-dimensional space, as in the prior art, and a three-dimensional problem is transformed to a two-dimensional problem and then is processed. This coordinate transformation is considered to cut the mesh on an x-y plane and the z-value on the lattice forms the curved surface. The meshes may or may not be situated equidistant. A surface display algorithm is employed as the algorithm of this embodiment. According to the surface display algorithm, a surface to be displayed is regarded as a group of tiny rectangular meshes, and the tiny meshes are displayed from the one farthest from the viewpoint.

The surface display algorithm will now be described specifically with reference to FIGS. 5 and 6.

Figure 5:
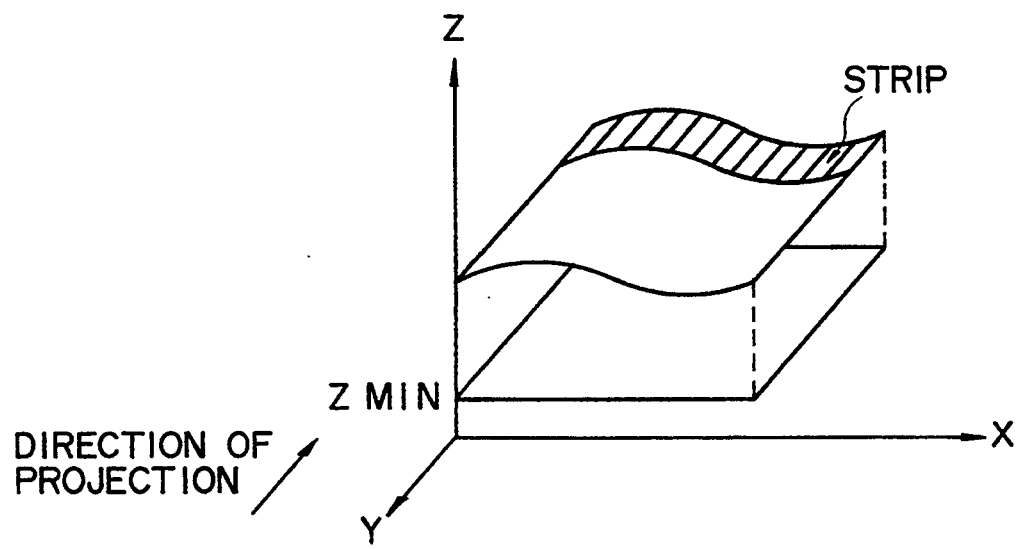
FIGS. 5 and 6 are views for explaining the principle of a surface display algorithm.
Figure 6:
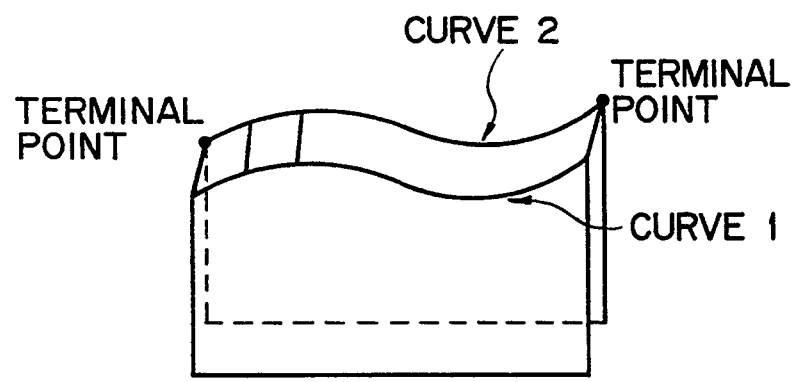

As is shown in FIG. 5, a curved surface to be displayed is divided in x- and y-directions, and the x- and y-coordinates and the z-coordinate (scalar value) of intersection are transformed under a normal projection. The normal projection is a method in which a viewpoint is set at the infinite point and an image is projected by parallel beams, thus effecting perspective transformation. According to this projection method, no perspectivity of the projected image is attained. A mesh strip of a divisional surface, which is farthest from the viewpoint, that is, a hatched portion in FIG. 5, is described. The curved surface is displayed successively from this mesh strip. The vertical lines at both ends of a curve define z-values ($z_{MIN}$) of the vertical lines defined from the xy plane. As is shown in FIG. 6, one region surrounded by curves 1 and 2 on two adjacent planes is considered as a mesh strip. The coordinates of both end points of one mesh strip are compared, and display processing is executed from a terminal point farthest from a view point given in preprocessing.

Figure 7A:
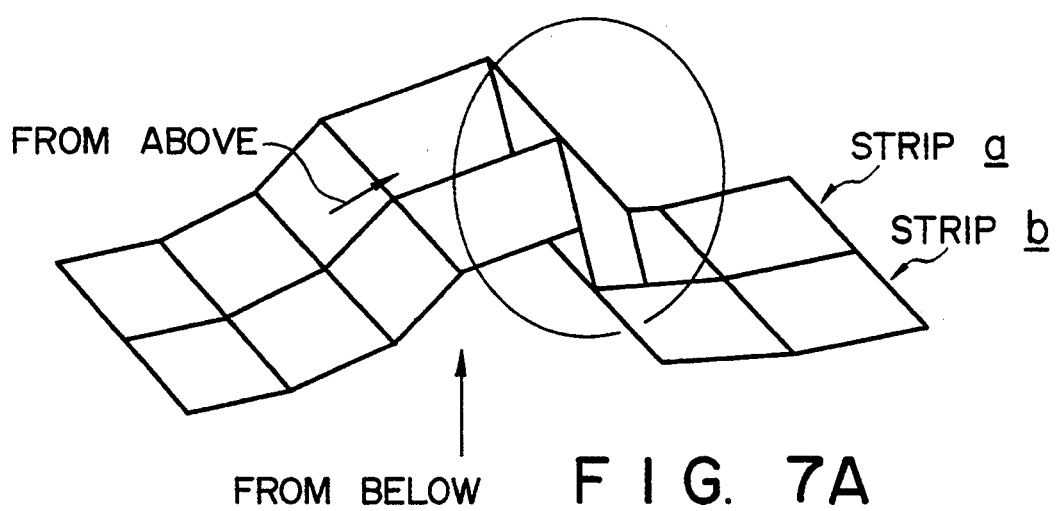
FIGS. 7A and 7B are views for explaining the method of selecting terminal points in the surface display algorithm.
Figure 7B:
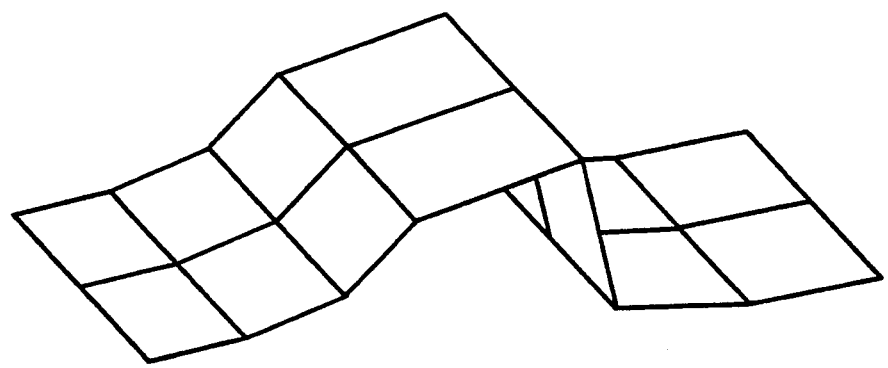

In the case where one mesh strip is displayed, if the strip is displayed in one direction, ignoring the locations of both ends of the strip, the strip may erroneously be displayed. This error occurs when the strip is described from the terminal point near the viewpoint. For example, where a projection figure, as shown in FIG. 7B (viewed from above) is to be drawn, if the direction of drawing the figure is fixed, for example, in an order from a minimum x-value, the projection value would be erroneously displayed, as shown in FIG. 7A. When the coordinate values of the terminal points of meshes a and b are compared and the projection figure is displayed from the portion farthest from the viewpoint, the projection figure is correctly displayed, as shown in FIG. 7B.

Next, the hidden-line processing of the present invention, in which the painting function is performed, will be described supplementarily.

The painting function is owned by the graphic terminal. In the painting function, pixels in a designated, closed region on a screen are painted by designated color, taking into account of the fact that the screen of the graphic terminal is an aggregation of pixels. Gaplessly arranged pixels are displayed in designated color; thus, previously displayed data (lines, in this case) are painted and new data (lines) are displayed. This function is utilized in hidden-line processing.

Figure 8A:
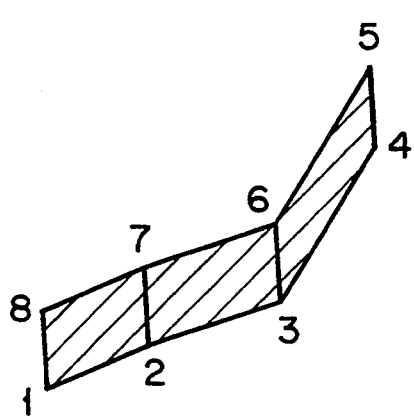
FIGS. 8A and 8B are views for explaining an hidden-line eliminating function.
Figure 8B:
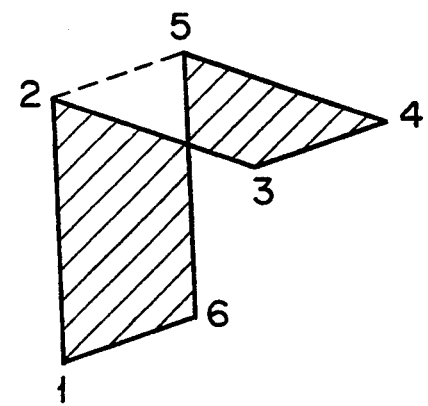

A specific example of the painting function is illustrated in FIGS. 8A and 8B. The numerals in the figures represent the order of a coordinate line. Given polygonal regions formed in the order of the coordinate line, that is, the hatched parts in the figure, are painted.

The surface display algorithm is more advantageous than the horizontal algorithm in that a complex curved surface can be displayed exactly. However, if data processing is performed for each tiny mesh, a great deal of time is required for data transfer or display. Thus, in the present invention, the state of distortion of each mesh and each pair of adjacent meshes is detected. The distorted portion is divisionally displayed, and non-distorted meshes (two or more) are displayed as a group.

The detection of distortion of mesh is performed as follows.

Figure 9:
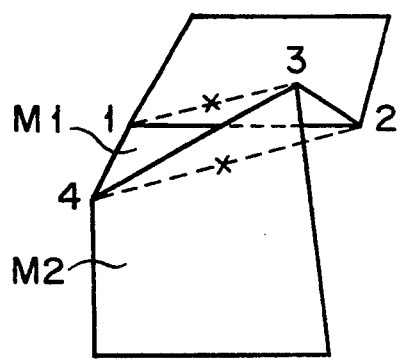
FIG. 9 is a view for explaining the state of distortion of a mesh and the method of determining the state.
Figure 10:
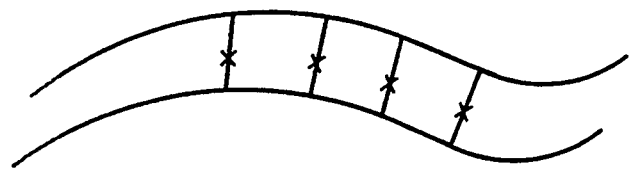
FIG. 10 is a view for explaining the method of determining the state of distortion of adjacent meshes.
Figure 11:
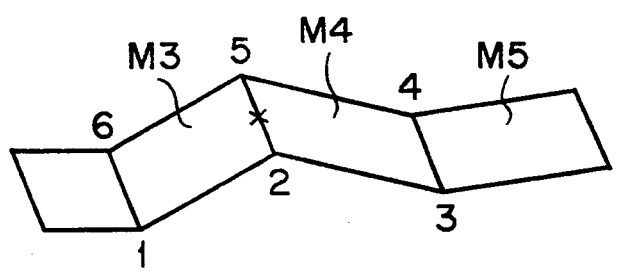
FIG. 11 shows an example of the state in which the adjacent meshes are not distorted (twisted)

The distortion of mesh is a phenomenon wherein when a mesh is described in accordance with the lattice coordinate line for defining the mesh, both sides of the mesh (mesh M1 in FIG. 9) appear simultaneously on a projected plane. Referring to FIG. 9, when midpoints of diagonals 1–3 and 2–4 of the mesh M1 having lattice coordinates 1 to 4 do not fall within a projected plane of the mesh obtained by connecting the coordinates 1 to 4, this mesh is determined to be distorted. If the distorted mesh M1 and adjacent mesh M2 are displayed as a group, the mesh is erroneously displayed because of the characteristic feature of the pointing function. The distorted mesh M1 should be displayed separately from the mesh M2. After the mesh M1 is displayed, the mesh M2 is displayed, whereby the portion of the mesh M1 which overlaps the Mesh 2 is painted, that is, the hidden-line processing is correctly carried out.

If there is no distorted mesh, a plurality of continuous meshes are painted as a group, and high-speed image processing is performed. In this case, it is determined if the midpoint of each boundary line (e.g. boundary line 2–5) of meshes falls within a projected plane closed and defined by the grouped meshes (e.g. meshes M3, M4 and M5). Thereby, the distortion of adjacent meshes is examined. The distortion of adjacent meshes denotes the state in which the obverse side of one of two adjacent meshes (e.g. M3 and M4) is displayed while the reverse side of the other is displayed. For example, in the example shown in FIG. 11, no distortion is present in the two adjacent meshes M3 and M4. This non-distorted state is determined by the fact that the midpoint of boundary line 2–5 is included in a polygonal region described by two meshes M3 and M4.

Figure 12:
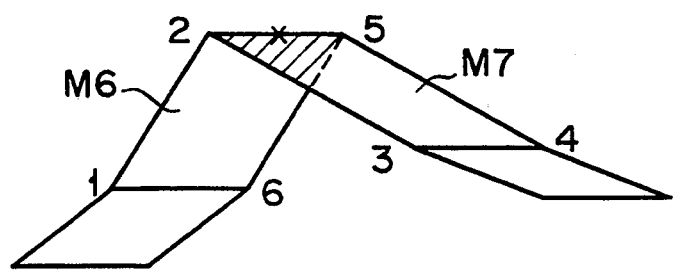
FIG. 12 shows an example of the state in which the adjacent meshes are distorted.

In the example shown in FIG. 12, a distortion appears in adjacent meshes M6 and M7. In this case, a midpoint of boundary line 2–5 does not present in a polygonal projected plane defined by the line of coordinates 1 to 6 indicating the grouped meshes M6 and M7. In the case where such distortion appears, the projected plane is displayed in an incorrect pattern unless the meshes M6 and M7 are displayed divisionally. In other words, the hatched part in FIG. 12 is not painted. In the present invention, where distortion appears in adjacent meshes, these meshes are displayed divisionally.

Figure 13:
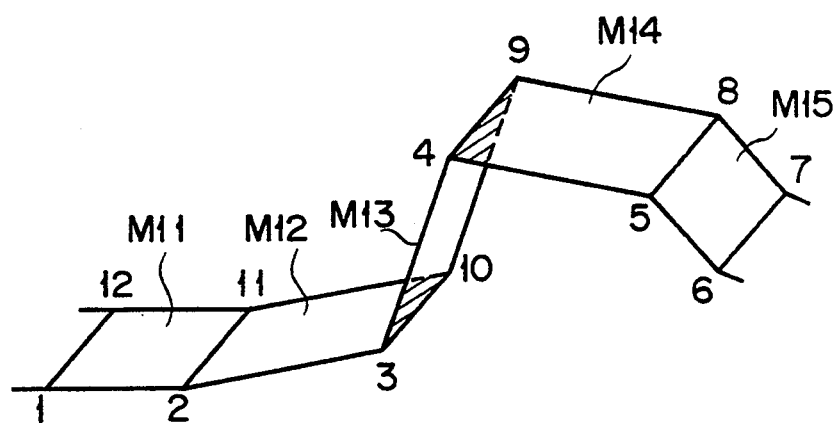
FIGS. 13 and 14 illustrate the method of determining the presence of distortion of a mesh strip and the method of grouping meshes.
Figure 14:
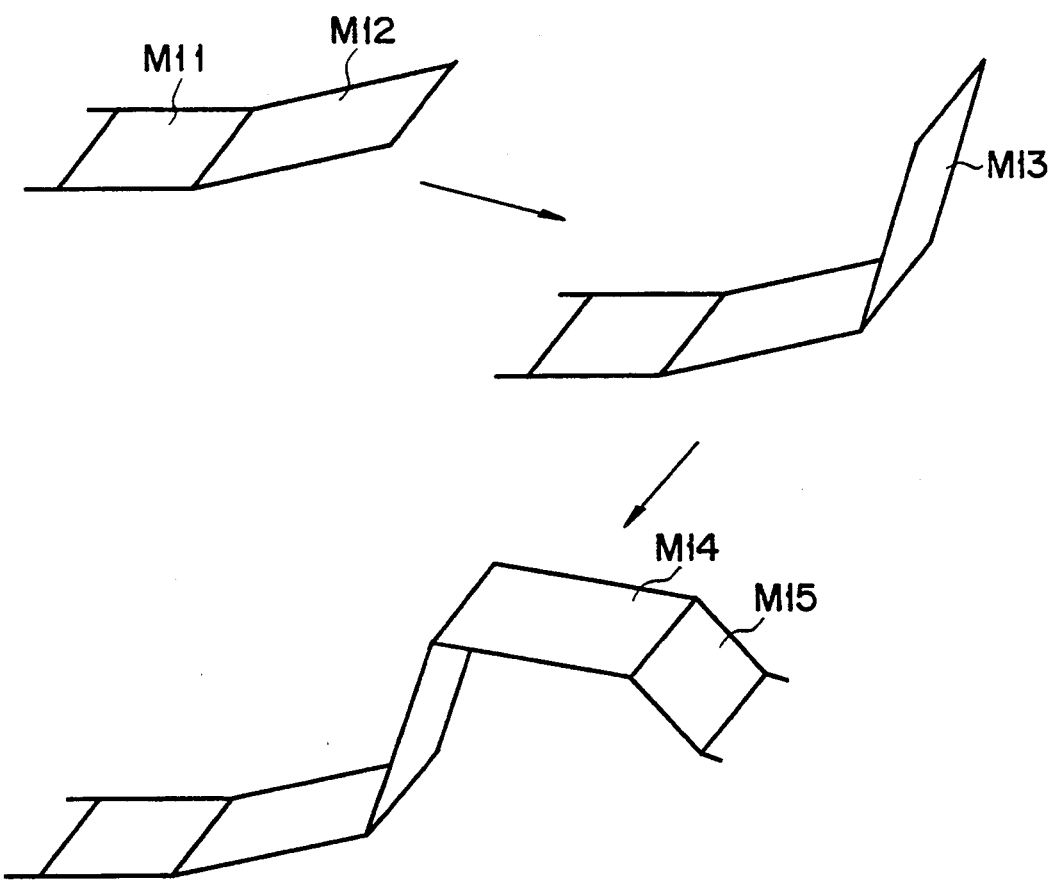

Referring to a more specific example shown in FIG. 13, a long region of a mesh strip comprising meshes M11 to M15 will now be considered. When the long region defined by coordinate points 1 to 12 is entirely displayed as one group, mesh M13 extending substantially vertically is erroneously displayed because hatched regions are not painted. In this case, in the present invention, it is first examined whether the midpoint of the boundary line of meshes M12 and M13 and the midpoint of the boundary line of meshes M13 and M14 exist in a polygonal projected plane drawn by the corresponding line of coordinates. Then, as shown in FIG. 14, the meshes M11 and M12 are displayed as one image, and the mesh M13 is overlapped on the mesh M12 with the overlapped portion of mesh M12 painted. Thereafter, the meshes M14 and M15 are displayed at a time. The mesh M14 is overlapped on the mesh M13, with the overlapped portion of the mesh M13 painted. In this invention, by the above display processing, a desired projected figure is exactly displayed. In addition, a plurality of meshes are processed in a group. The drawback of surface display algorithm, i.e. an increase in processing time, can be overcome, and high-speed display processing can be carried out.

In order to determine the presence of distortion in adjacent meshes, it is important that the midpoint of the boundary line of adjacent two meshes be employed for determination. For example, if a mesh strip comprising three meshes is determined by a single determination process in order to reduce the number of determination processes, a projected plane may be displayed with an incorrect pattern.

FIG. 15A shows the state in which a mesh strip comprising meshes M21 to M23 is exactly displayed. Suppose that this mesh strip is determined with use of a polygonal region defined by lattice points 1 to 8. In this case, a midpoint a of a boundary line 3–6 is included in this polygonal region, as shown in FIG. 15B; thus, the mesh strip is displayed as an incorrect figure, as shown in FIG. 15C. This kind of erroneous display must be avoided. If the two adjacent meshes M22 and M23 are determined on the basis of a polygon defined by lattice points 2 to 7, the above erroneous display can be prevented.

Figure 16A:
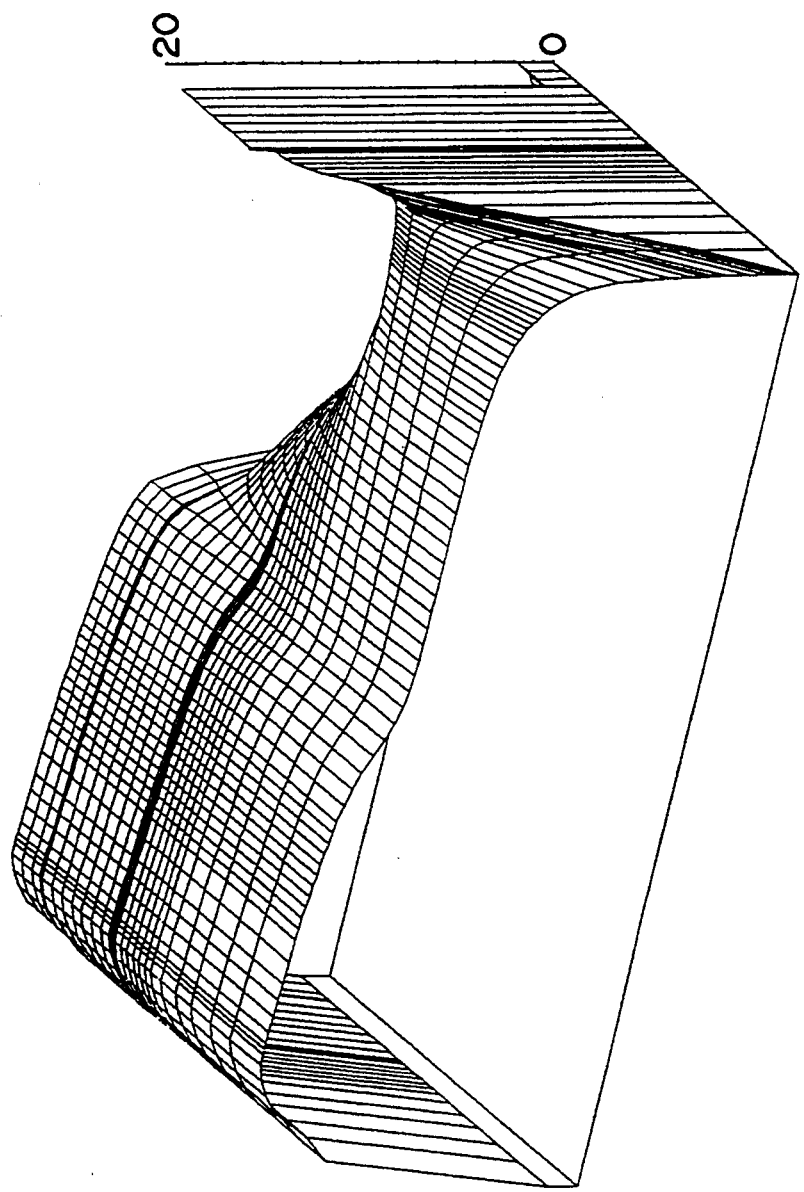
FIGS. 16A and 16B show examples of electron concentration distribution according to the embodiment of the invention.
Figure 16B:
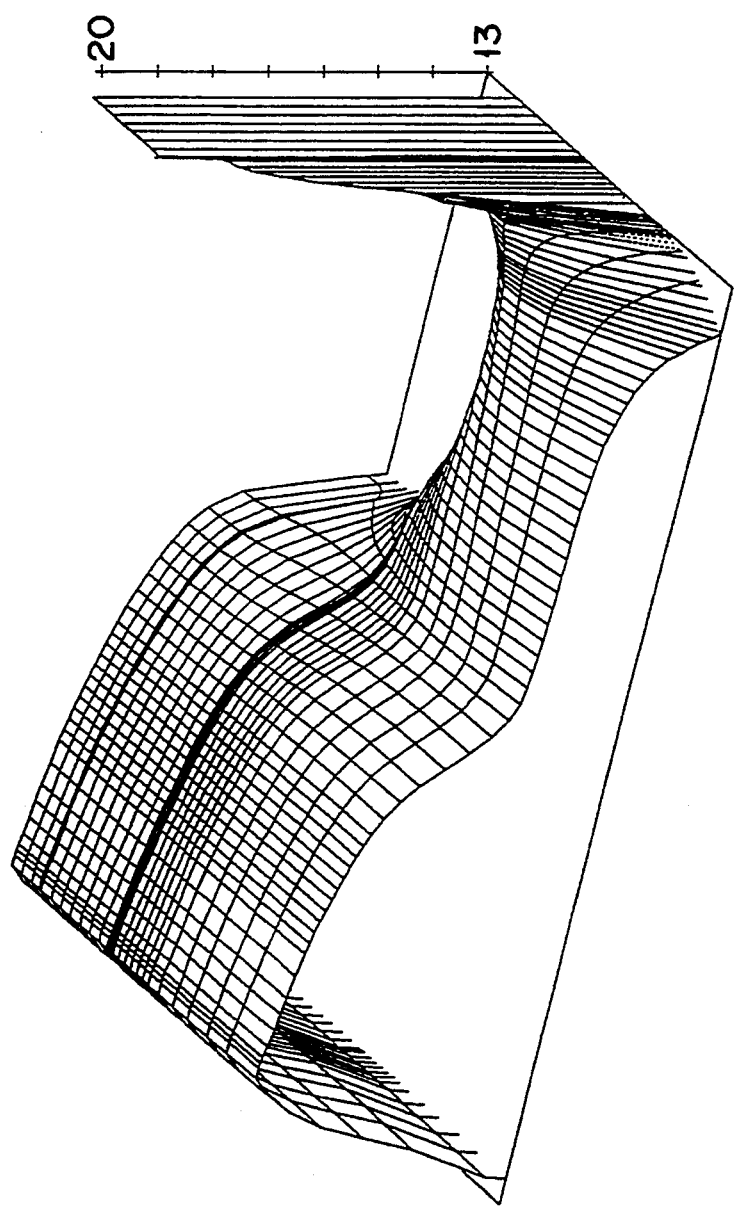
Figure 17:
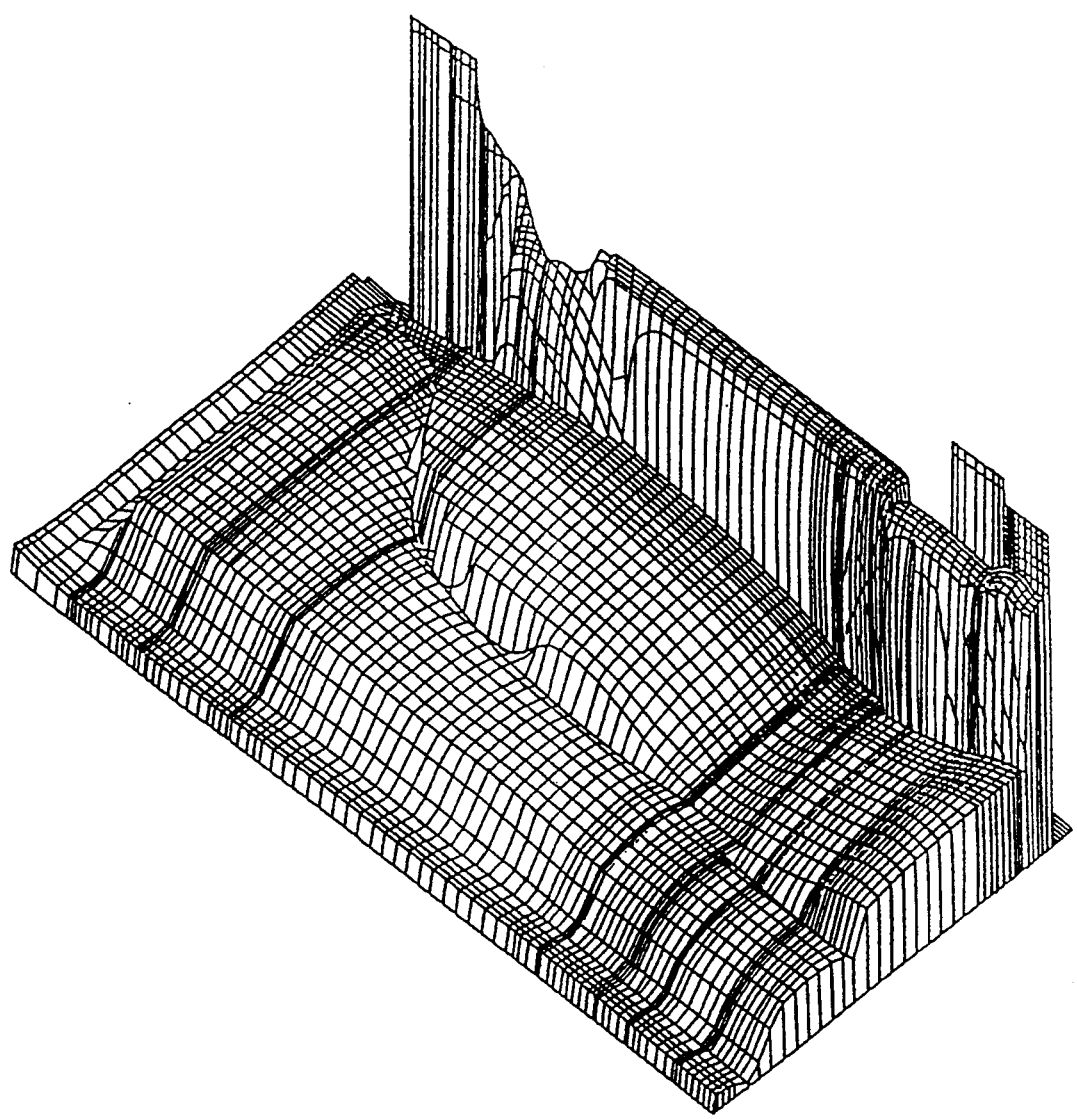
FIG. 17 shows a concentration distribution in a lateral insulation gate bipolar transistor, which was formed by the method of this invention.

FIGS. 16A and 16B illustrate an example in which an electron concentration distribution in a cross section of a semiconductor device is displayed according to the method of the embodiment of this invention. FIG. 16A is an entire view, and FIG. 16B shows a partial layer representing the concentration distribution of FIG. 16A, when the cutting plane is set at z=13. FIG. 17 shows an example of a displayed electron concentration distribution in a cross section of a lateral type IGBT (Insulated Gate Bipolar Transistor) shown in FIG. 18.

As is seen from the above two examples, fine portions of the concentration distribution are hidden-line processed exactly and displayed. Regarding regions with no sharp variation in concentration distribution, a plurality of meshes are hidden-line processed as a group, thereby enabling high-speed processing to be carried out.

Where the host computer 11 and terminal device 12 in the computer system of FIG. 1 are connected by telephone lines or the like, the speed of signal transmission therebetween determines the speed of image processing. Accordingly, in this invention, it is considered that the number of times of data transmission between the host computer 11 and terminal device 12 is reduced. Until distortion occurs in meshes, the image data is formed as the region to be drawn at a time is broadened for image processing. Thus, the number of times of issuing painting commands is smaller, compared to a conventional method in which the painting is effected in units of small region, and also the number of times of painting regions is decreased. As a result, the time required for processing complex images can be remarkably reduced.

In the computer system shown in FIG. 1, the processing executed by a processing program may be executed by hardware. Specifically, the processing program may be replaced by hardware such as drawing means for drawing a projected image from a portion farthest from a viewpoint, means for determining distortion, means for grouping distortion-free meshes, etc.

As has been described above, according to the embodiments of the invention, when a three-dimensional projection figure is graphic-displayed, distortion determination is performed on an image with a sharply varied configuration. Thereby, a projected figure can be exactly displayed. In addition, by grouping a plurality of meshes and subjecting the group to hidden-line processing, high-speed processing can be carried out. Furthermore, by setting conditions for determining a display range in advance, a desired partial layer can be displayed.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A graphic display processing method of displaying a three-dimensional structure on a two-dimensional display plane, the three-dimensional structure being an aggregation of rectangular elements, in which a filling function of a graphic terminal is performed on a plurality of rectangular element groups which are projected on the two-dimensional display plane form the one which is farthest from a viewpoint in three-dimensional observation to the one which is closest to the viewpoint in three-dimensional observation, and a projection figure of the three-dimensional structure as seen from the viewpoint is hidden-line processed, thereby displaying the projection figure on the two-dimensional display plane, said method comprising a step of:

displaying the projection figure by executing a hidden-line processing for eliminating hidden lines from a plurality of groups of the rectangular elements containing no distortion, wherein the hidden-line processing includes the steps of:

(a) determining a distortion state of one rectangular element having a terminal point which is farthest from the viewpoint in three-dimensional observation, said one rectangular element belonging to a rectangular element group which is farthest from the viewpoint in three-dimensional observation;

(b) storing, when said one rectangular element has distortion, coordinate data indicating a location of said one rectangular element;

(c) displayiny said one rectangular element independently on the two-dimensional display plane;

(d) determining, when said one rectangular element has no distortion, a distortion state of two rectangular elements which include said one rectangular element and another rectangular element adjacent thereto;

(e) storing, when the two rectangular elements adjacent to each other have distortion, data indicating a boundary of the two rectangular elements;

(f) displaying the two rectangular elements independently on the two-dimensional display plane, and wherein said displaying step groups a plurality of rectangular elements, which have no distortion individually or in any pair of adjacent ones, as one region, subjects the region to the hidden-line processing based on the filling function, displays peripheral lines and boundary lines of rectangular elements of the region, and displays the rectangular element groups successively towards the viewpoint.

2. The method according to claim 1, wherein said step (a) of determining a distortion state of one rectangular element is a step for determining that said one rectangular element has a distortion when a midpoint of each of two diagonals of said one rectangular element is not included in a projected plane of said one rectangular element, which is obtained from the viewpoint.

3. The method according to claim 1, wherein said step (d) of determining a distortion state of two rectangular elements adjacent to each other is a step for determining that a group of said two rectangular elements has a distortion when a midpoint of a boundary line between the two rectangular elements is not included in a polygonal projected plane obtained when said two rectangular elements are observed from the viewpoint, said polygonal projected plane having six corner points.

4. The method according to claim 1, wherein each of said rectangular element groups is formed of a group of rectangular elements arrayed in a strip form.

5. The method according to claim 1, which further includes a step of determining a portion to be displayed and a portion not to be displayed for each of said rectangular elements, in accordance with a predetermined cutting plane.

6. A graphic display processing method of displaying a three-dimensional structure on a two-dimensional display plane, the three-dimensional structure being an aggregation of rectangular elements, in which a filling function of a graphic terminal is performed on a plurality of rectangular element groups which are projected on the two-dimensional display plane, each of said element groups having a plurality of rectangular elements, from the one which is farthest from a viewpoint in three-dimensional observation to the one which is closest to the viewpoint in three-dimensional observation, and a projection figure of the three-dimensional structure as seen from the viewpoint is hidden-line processed, thereby displaying the projection figure on the two-dimensional display plane, said method comprising a step of:

determining a portion to be displayed and a portion not to be displayed for each of said rectangular elements which has a display plane, by use of a predetermined cutting plane; and displaying a partial layer by executing a hidden-line processing for eliminating hidden lines from a plurality of rectangular elements corresponding to said portion to be displayed and having no distortion, wherein the hidden-line processing includes the steps of:

(a) determining a distortion state of one of said rectangular elements, said one rectangular element having a terminal point which is farthest from the viewpoint in three-dimensional observation, and belonging to a rectangular element group which is farthest from the viewpoint in three-dimensional observation;

(b) storing, when said one rectangular element has distortion, coordinate data indicating a location of said one rectangular element;

(c) displaying said one rectangular element independently on the two-dimensional display plane;

(d) determining, when said one rectangular element has no distortion, a distortion state of two rectangular elements which include said one rectangular element and another rectangular element adjacent thereto;

(e) storing, when the two rectangular elements adjacent to each other have distortion, data indicating a boundary of the two rectangular elements;

(f) displaying the two rectangular elements independently on the two-dimensional display plane, and wherein said partial layer displaying step groups a plurality of rectangular elements, which have no distortion individually or in any pair of adjacent ones, as one region, subjects the region to the hidden-line processing based on the filling function, displays peripheral lines and boundary lines of rectangular elements of the region, and displays the rectangular element groups successively towards the viewpoint.

7. The method according to claim 6, wherein said step (a) of determining a distortion state of one rectangular element is a step for determining that said one rectangular element has a distortion when a midpoint of each of two diagonals of said one rectangular element is not included in a projected plane of said one rectangular element, which projected plane is obtained from the viewpoint.

8. The method according to claim 6, wherein said step (d) of determining a distortion state of two rectangular elements adjacent to each other is a step for determining that a group of said two rectangular elements has a distortion when a midpoint of a boundary line between the two rectangular elements is not included in a polygonal projected plane obtained when said two rectangular elements are observed from the viewpoint, said polygonal projected plane having six corner points.

9. A graphic display processing method of displaying a three-dimensional structure on a two-dimensional display plane, the three-dimensional structure being an aggregation of rectangular elements, in which an erasure function of a graphic terminal is performed on a plurality of rectangular element groups which are projected on the two-dimensional display plane, each of said element groups having a plurality of rectangular elements, from one of said plurality of rectangular element groups which is farthest from a viewpoint in three-dimensional observation to the one thereof which is closest to the viewpoint in three-dimensional observation, and a projection figure of the three-dimensional structure as seen from the viewpoint is hidden-line processed, thereby displaying the projection figure on the two-dimensional display plane, said method comprising a step of:

(a) determining a distortion state of one of said rectangular elements, said one of said rectangular elements including a terminal point farthest from the viewpoint, and belonging to one of said rectangular element groups which is farthest from the viewpoint;

(b) storing, when the rectangular element has distortion, coordinate data of a location of said one rectangular element;

(c) displaying said one rectangular element independently on the two-dimensional display plane;

(d) determining, when said one rectangular element has no distortion, a distortion state of two rectangular elements which include said one rectangular element and another rectangular element adjacent thereto;

(e) storing, when the two rectangular elements adjacent to each other have distortion, data indicating a boundary of the two rectangular elements;

(f) displaying the two rectangular elements independently on the two-dimensional display plane, (g) grouping a plurality of rectangular elements, which have no distortion individually or in any pair of adjacent ones, as one region, executing the hidden-line processing for elimination from the region based on the filling function, and displaying peripheral lines and boundary lines each being between two adjacent rectangular elements of the region; and (h) displaying said rectangular element groups successively towards the viewpoint.

10. The method according to claim 9, which said step (a) of determining a distortion state of one of said rectangular elements includes a step of determining that said one of said rectangular elements includes a distortion, when a midpoint of each of two diagonals of said one rectangular element is not included in a projected plane of said one rectangular element, which projected plane is obtained from the viewpoint.

11. The method according to claim 9, wherein said step (d) of determining a distortion state of two rectangular elements includes a step of determining that said two rectangular elements include distortion, when a midpoint of a boundary line of the two rectangular elements is not included in a polygonal projected plane of the two rectangular elements which is obtained from the viewpoint.

* * * * *